(12) United States Patent
Gerard et al.

(10) Patent No.: US 6,230,311 B1
(45) Date of Patent: May 8, 2001

(54) APPARATUS AND METHOD FOR DISABLING METHODS CALLED ON AN OBJECT

(75) Inventors: Scott Neal Gerard; Steven Lester Halter; Steven J. Munroe; Erik E. Voldal, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/096,880

(22) Filed: Jun. 12, 1998

(51) Int. Cl.$^7$ ........................................................ G06F 9/45
(52) U.S. Cl. ...................... 717/2; 717/5; 717/1; 709/315
(58) Field of Search ................................. 709/315, 316, 709/104, 147, 213; 717/1, 2, 5; 713/3; 707/8, 9, 1; 710/119

(56) References Cited

U.S. PATENT DOCUMENTS

| | | | |
|---|---|---|---|
| 5,339,438 | * | 8/1994 | Conner et al. ............................. 717/5 |
| 5,371,884 | * | 12/1994 | Ross ......................................... 714/10 |
| 5,568,644 | * | 10/1996 | Nelson et al. ......................... 710/268 |
| 5,680,624 | * | 10/1997 | Ross ....................................... 710/261 |
| 5,701,470 | * | 12/1997 | Joy et al. .............................. 707/103 |
| 5,745,570 | * | 4/1998 | Voldal ....................................... 380/4 |
| 5,835,701 | * | 11/1998 | Hastings ................................. 714/35 |
| 6,026,401 | * | 2/2000 | Brealey et al. ............................ 707/8 |
| 6,052,531 | * | 4/2000 | Waldin, Jr. et al. ..................... 717/11 |
| 6,052,739 | * | 4/2000 | Bopardikar et al. .................. 709/301 |
| 6,125,439 | * | 9/2000 | Tremblay et al. ..................... 712/202 |
| 6,151,703 | * | 11/2000 | Crelier ...................................... 717/5 |

* cited by examiner

Primary Examiner—Kakali Chaki
Assistant Examiner—Chameli C. Das
(74) Attorney, Agent, or Firm—S. Jared Pitts; Mark F. Wright

(57) ABSTRACT

The present invention provides an object-oriented disabling mechanism which selectively disables object methods. The object-oriented disabling mechanism prevents the selected methods from being called on an object by other programs or processes via various alternative embodiments. A first preferred embodiment of the object-oriented disabling mechanism works in conjunction with a plurality of method tables to restrict method calls on an object. An alternative preferred embodiment of the object oriented disabling mechanism works in conjunction with a read flag and a write flag to define which methods can be called on an object. Another alternative preferred embodiment of the object oriented disabling mechanism uses software "locks" and a lock conflict matrix associated with the object to determine which methods can be called on an object. A final alternative preferred embodiment of the object oriented disabling mechanism uses a transactional mechanism to commit or rollback changes made to an object as a result of method calls.

35 Claims, 8 Drawing Sheets

APPARATUS AND METHOD FOR DISABLING METHODS CALLED ON AN OBJECT

BACKGROUND OF THE INVENTION

1. Technical Field

This invention generally relates to object-oriented programming and more specifically relates to altering the functionality of an object.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

Closely connected with objects is the concept of "classes" of objects. A class is a formalized definition of a set of like objects. As such, a class can be thought of as an abstraction of the objects or as a definition of a type of object. Each object that is created in an object-oriented system is an instance of a particular class. Objects within an object oriented environment communicate and interact with each other via "method calls" or "methods" which define the relationship between objects and which specify the activities and procedures that a given object can perform.

An object in an object-oriented computer program typically has attributes defined by state data that determine how the object will behave. If an object is "transient," it is created by a process, and will terminate when the process that created it ends. If an object is "persistent," however, mechanisms are put in place to allow the object to survive the process that creates it so it can be accessed by other processes including processes that have not yet been created.

Computer programs naturally evolve over time. The evolution of object-oriented computer programs entails defining new classes that frequently have implementations different from previous versions. As time passes, the type and quantity of information stored by an object may need to be changed or enhanced to accommodate additional or different data types. In this case, the definition of the class for the object will, of necessity, be changed to support the new object data storage requirements. This typically occurs whenever a software program is upgraded from a first version to a newer, more powerful version of the program. A new release of an existing program may use a combination of new classes and existing classes that were defined in a previous version. The processes and activities associated with modifying, updating, and tracking changes in a class of objects over a period of time are known as "versioning."

When the current version of an object is going to be updated, a copy of the original object may be made. This copy is made in order to preserve the state data of the original object. The state data of this copy is created based on the state data of the original object. The copy of the original object is a new object with a new object identity. It can be understood that once a version update is performed on an object, two versions of the object exist. The original object still exists with its original state data and object identity, and the new object exists with its new object identity and new version of state data. Both of these objects are "live" in the sense that all methods can be called on them by other existing objects.

When an object-oriented system is designed, the organizational structure of the system will be based on the objectives and purposes for the system. The system will also be implemented based upon these objectives and purposes. When an object is created, it can be assumed that the objectives and purposes defined for the object allow the object to be fully functional. However, when an existing object is updated, the existing object becomes out of date because a new version of the object exists. Even thought the new object will be used in the system, in some cases it may be desirable to preserve the original version of the existing object. To ensure that the old object remains unchanged, all procedures or methods which may modify the existing object must be disabled. In order to prevent these methods from being called on an existing object, the implementation of the system must change.

In other situations, system policy may allow certain limited types of changes to be made to the original object while other, more intrusive changes may be prohibited. In order to ensure that the original object is modified only as permitted by system policy or objectives, a subset of all possible methods may need to be disabled. Only those methods which would alter the object in an unacceptable fashion must be disabled. It can be assumed that any methods which can access the original object without changing it may still be called in order to allow system users to view the data belonging to the object.

The following example may be used to demonstrate the problems encountered in calling methods on different versions of a given object. For example, in order to track annual sales figures for their products, a sales corporation may create an object in an object oriented system called "Yearly Sales." All of the objects that need to reference the Yearly Sales object will contain a pointer to the Yearly Sales object. At the end of each month, the sales data for the proceeding month is entered into the Yearly Sales object, providing a cumulative figure for the company's year-to-date sales. The corporation may also have a Purchasing Department and an Accounting Department which use an object-oriented system having an object which references the Yearly Sales object to determine how many goods to order.

For purposes of demonstrating the problems in existing object-oriented technology, it should be assumed that the Yearly Sales object has just been updated to include data for the month of June. As a result of updating the object at the end of June, two versions of the Yearly Sales object exist in the system. The old version of the Yearly Sales object contains sales data for the months of January through May and the new version of the object contains sales data for the months of January through June.

The Purchasing Department accesses the Yearly Sales object to determine how many goods to order. In deciding which clothing items to purchase, the Purchasing department checks the sales figures in the Yearly Sales object for the proceeding month. In order to procure the correct number of each item, the sales figures for the proceeding month must be accurate. Therefore, the Purchasing Department must access the old version of the Yearly Sales object to check the sales figures for the month of May. As mentioned, the Purchasing Department needs the data to be accurate, therefore the data for the month of May in the old version of the Yearly Sales object cannot be altered.

The Accounting Department, may need the data for the month of May from the old version of the Yearly Sales object to perform accounting functions. These accounting functions include the use of the data contained within the Yearly Sales object to add additional sales figures to the object, such as sales by department. Although the Accounting department needs to make changes to the old version of the object, the original sales data for the month of May will not be changed.

Since the changes made by the Accounting Department will not alter the data for the month of May, the write methods called on the Yearly Sales object by the Accounting Department will not interfere with the needs of the Purchasing Department. However, any write methods which will actually change the sales data in the Yearly Sales object from the month of May must be disabled. While it may be desirable to allow the Accounting Department and the Purchasing Department to access the Yearly Sales object, the integrity of the data contained in the Yearly Sales object may be inadvertently comprised if an existing related object updates perform an inappropriate write method on the object. In current object-oriented systems, there is no simple way to selectively disable write methods called on a given object. It is possible to reprogram or redesign the object in order to disable methods, however, this procedure must be continually repeated, adding a significant amount of overhead whenever object methods are to be disabled or reestablished. While it may be desirable to disable certain methods on an object, at the present time there is no way to accomplish this goal without requiring a programmer to modify the methods calls for a given object.

As the number of applications and systems using object-oriented technology increases, it will become increasingly important to be able to implement system objectives which may require disabling all or some write methods, and to prevent some subset of the methods from being called on an object. Without a simple and flexible mechanism for selectively disabling certain methods according to system objectives, the time and effort required to restrict access to data in different object versions will be unnecessarily expanded.

SUMMARY

The present invention provides an object-oriented disabling mechanism which selectively disables object methods. The object-oriented disabling mechanism prevents the selected methods from being called on an object by other programs or processes via various alternative embodiments. A first preferred embodiment of the object-oriented disabling mechanism works in conjunction with a plurality of method tables to restrict method calls on an object. An alternative preferred embodiment of the object oriented disabling mechanism works in conjunction with a read flag and a write flag to define which methods can be called on an object. Another alternative preferred embodiment of the object oriented disabling mechanism uses software "locks" and a lock conflict matrix associated with the object to determine which methods can be called on an object. A final alternative preferred embodiment of the object oriented disabling mechanism uses a transactional mechanism to commit or rollback changes made to an object as a result of method calls.

BRIEF DESCRIPTION OF DRAWINGS

The preferred embodiments of the present invention will hereinafter be described in conjunction with the appended drawings, where like designations denote like elements; and:

FIG. 3 is a block diagram of the object of FIG. 2 referencing a third method table according to a preferred embodiment of the present invention;

BEST MODE FOR CARRYING OUT THE INVENTION

Figure 1:
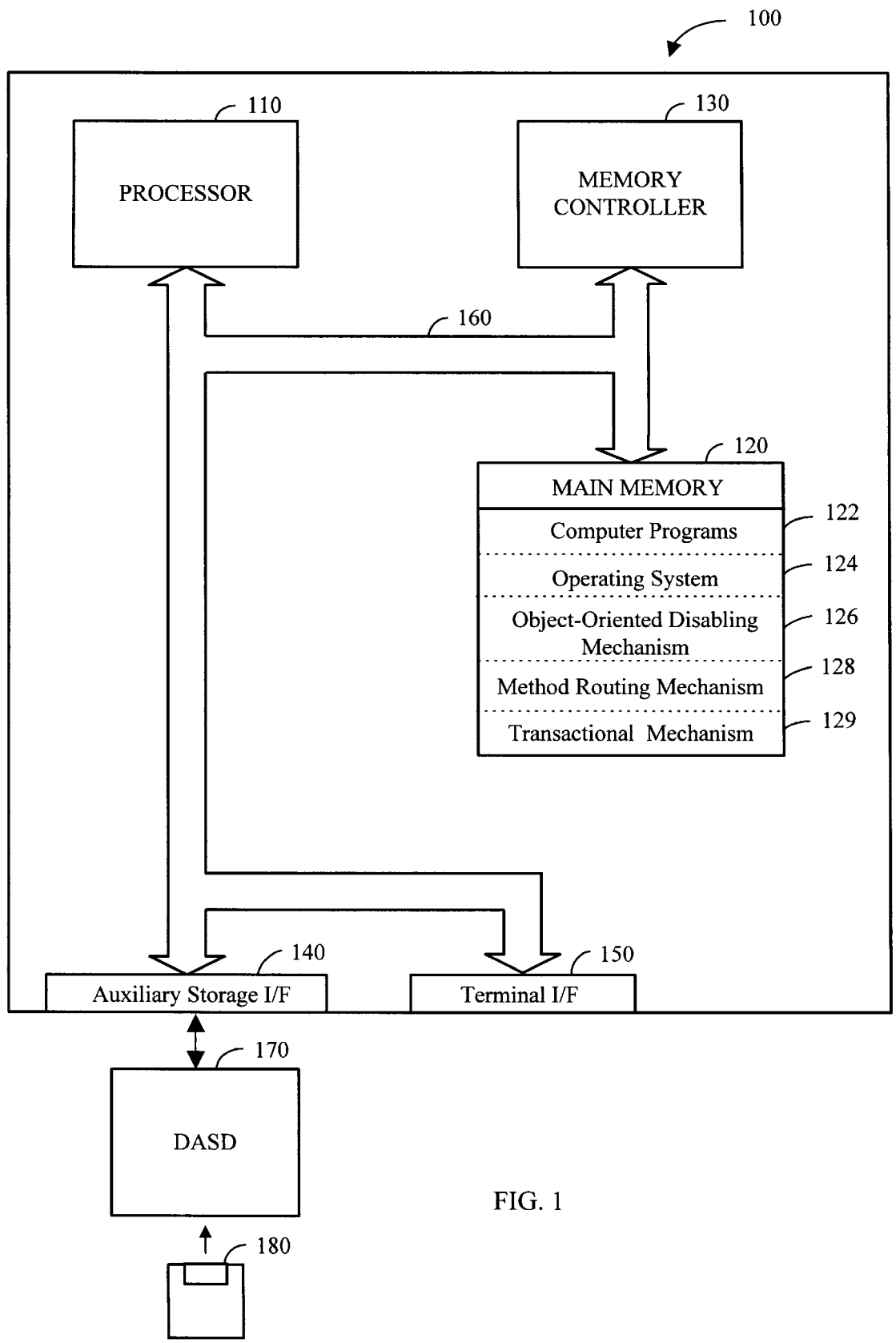
FIG. 1 is a block diagram of an apparatus according to a preferred embodiment of the present invention.

The present invention relates to object-oriented programming techniques. For those individuals who are not generally familiar with object-oriented programming, the Overview section below presents many of the basic concepts and terminology that will help to understand the invention. Individuals skilled in the art of object-oriented programming may wish to skip this section and proceed directly to the Detailed Description section of this specification.

1. Overview

Object-Oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different from that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and JAVA are all examples of languages that support object-oriented programming to one degree or another.

2. Detailed Description

According to the present invention, an apparatus and method for selectively disabling method calls is disclosed. Using an object-oriented disabling mechanism, it is possible to prevent selected methods from being called on an object by other programs or processes. These other programs or processes may be existing related objects or any other type of code.

A preferred embodiment of the object-oriented disabling mechanism works in conjunction with a plurality of method tables to restrict method calls on an object. Only the methods listed in the method table currently referenced by the method table pointer contained in the object can be called on the object. The methods listed within the method table may be based upon various system objectives. The object-oriented disabling mechanism builds a new method table containing a unique subset of the original methods whenever system objectives require that a method be added to or deleted from the currently referenced method table and the desired method table does not exist. Once a new method table is created, the method table pointer can be updated to reference the new method table. After the method table pointer is updated to reference the new table, only the methods listed in the new table can be called on the object.

An alternative preferred embodiment of the object oriented disabling mechanism works in conjunction with a read flag and a write flag to define which methods can be called on an object by existing related objects or other processes or programs. According to the present invention, an object has two flags, a read flag and a write flag. Each flag has a value of either one or zero. Each time a method is called on the object, the method routing mechanism checks the value of the read flag or the write flag. If the value of the object read flag is one, all read methods listed in a method table referenced by the object can be called on the object by other existing related objects or code. If the value of the object write flag is one, all write methods listed in a method table referenced by the object can be called on the object. However, if a read or write flag is set to zero, the methods associated with that flag will be disabled. This alternate preferred embodiment of the present invention uses simple bit mask operations to force the value of the object write flag to zero, thereby preventing write operations from being called on the object.

Another alternative preferred embodiment of the object oriented disabling mechanism uses object "locks" to prevent methods from being called on an object by existing related objects. Each time a process calls a method on a called object, a method routing mechanism determines whether the method is a read method or a write method. The method routing mechanism then accesses a lock conflict matrix associated with the object to determine whether the given method can be called on the called object.

A final alternate preferred embodiment of the object oriented disabling mechanism uses a transactional mechanism to prevent changes from being made on an object. Specifically, a transactional mechanism allows a write method to be called on an object by an existing related object or other code. At the end of the transaction, the transactional mechanism determines whether the object's state data has been modified. This can be done by comparing before and after images of the object, or by checking the value of a flag in the object which is set when the object is modified. The transactional mechanism then determines whether changes can permissibly be made to the object by checking the value of a write flag associated with the object. If the value of the write flag is one, changes can be made to the object and the transactional mechanism allows the object to be saved into memory. Conversely, if the value of the write flag is zero, the transactional mechanism "rolls back" the transaction to prevent the changes made to the object by the write method from becoming permanent.

Referring now to FIG. 1, a computer system 100 in accordance with a preferred embodiment of the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains: one or more computer programs 122; an operating system 124; an object-oriented disabling mechanism 126; a method routing mechanism 128; and transactional mechanism 129. Computer program 122 in memory 120 is used in its broadest sense, and includes any and all forms of computer programs, including source code, intermediate code, machine code, and any other representation of a computer program known to those skilled in the art.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, although computer program 122 is shown to reside in the same memory location as operating system 124, and object-oriented disabling mechanism 126, it is to be understood that main memory 120 may consist of multiple disparate memory locations.

According to the present invention, an object-oriented disabling mechanism is provided which works in conjunction with a method table to control which methods can be called on an object. A preferred embodiment of the present invention includes an object having a header section which contains a method table pointer.

The method table pointer references a table of methods that contains all of the methods which can be called on the object. A change in the system objectives defined for an object may require a change in the definition for an object. For example, certain changes made to the data contained within the object may need to be prevented. In order to allow only a unique subset of methods from the original complete table of read and write methods to be called on the object, the object-oriented disabling mechanism simply builds a new method table.

The new method table will contain only the selected methods that can be called on the object as defined by the system objectives for the object and will omits the methods that cannot be called on the object. Once the object oriented disabling mechanism creates this new method table, the disabling mechanism updates the method table pointer to reference the new method table. After the mechanism updates the method table pointer, only the methods listed in the new method table can be called on the object. Changes in system policy may require that several new tables be created and referenced by objects. Or, changes in system policy may require the object pointer be updated to reference one of any number of existing method tables.

When a calling object calls a method on an object, herein called the called object, a method routing mechanism intercepts the method call before the method is actually called on the called object. The method routing mechanism references the method table referenced by the called object to determine whether the specified method can be called on the called object. If the called method is listed in the method table, the method routing mechanism allows the method to be called on the called object. Otherwise, if the called method is not listed in the method table, the method routing mechanism prevents the method from being called on the called object. If the method is not allowed, the system may return an error message to the calling object.

Figure 2:
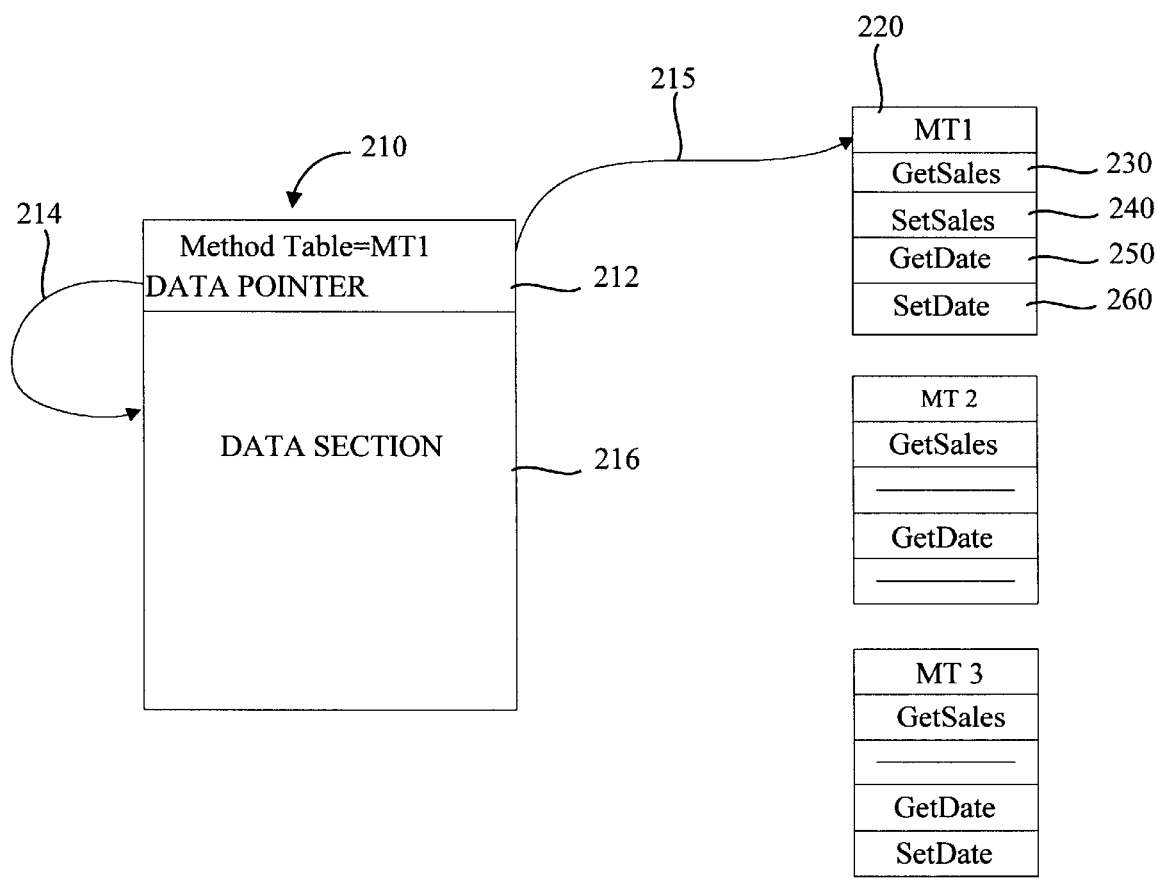
FIG. 2 is a block diagram of an object referencing a first method table according to a preferred embodiment of the present invention.
Figure 3:
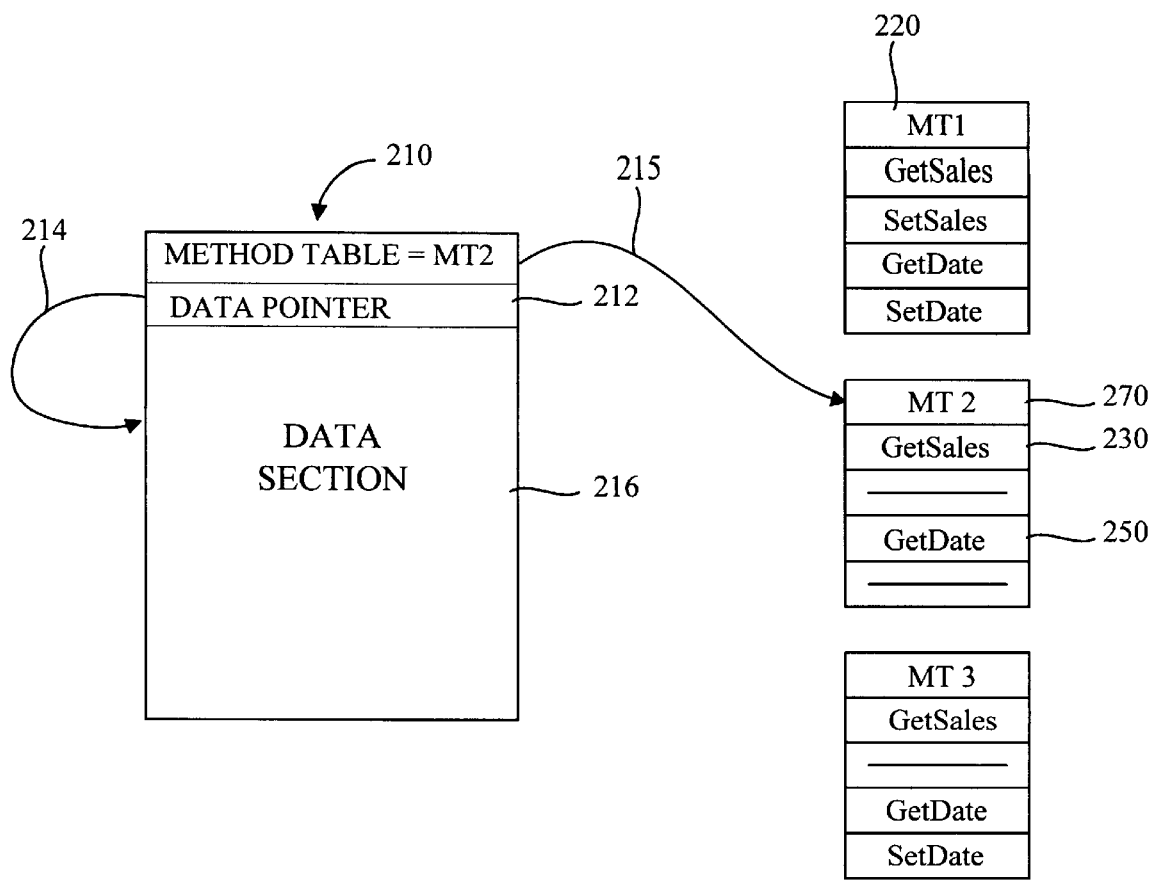
FIG. 3 is a block diagram of the object of FIG. 2 referencing a second method table according to a preferred embodiment of the present invention.
Figure 4:
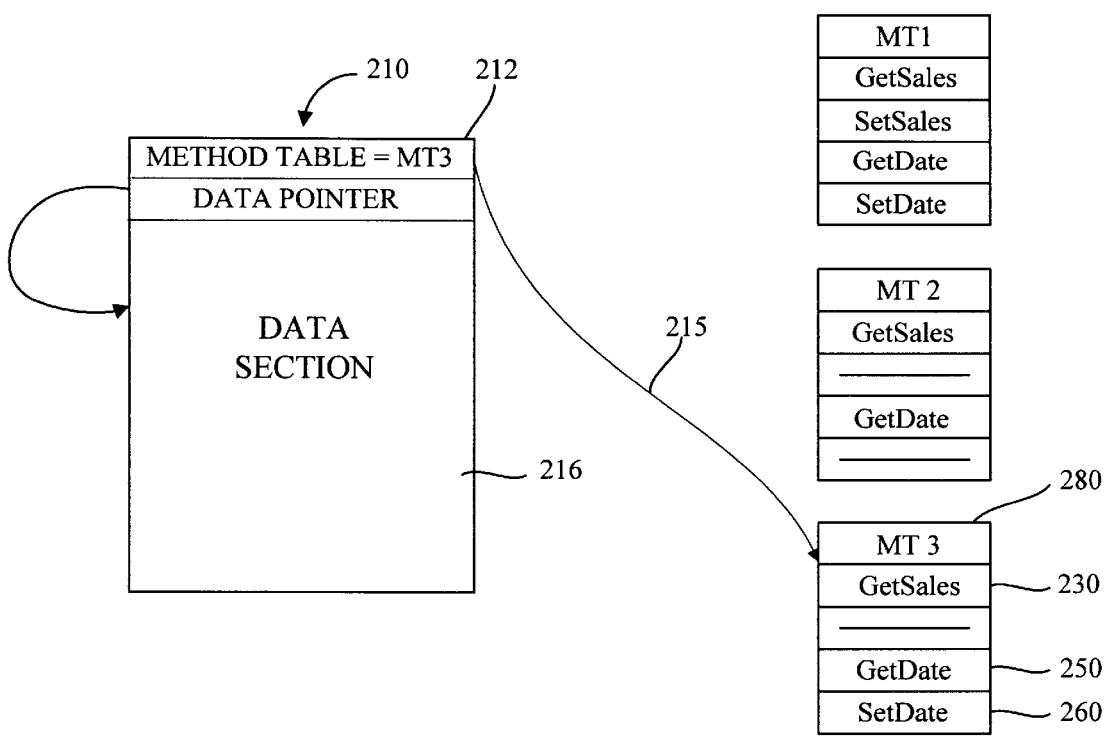

Referring now to FIGS. 2–4, a specific example of using method tables to disable method calls on an object is presented. In the following example, three method tables have been created, entitled MT1, MT2, and MT3, respectively, in order to provide a reference to the reader. In reality, the object would simply have a method table pointer which references the memory location corresponding to the correct table. As mentioned, the object-oriented disabling mechanism can create a new method table each time a change in system objectives change the definition of the object so that only a unique subset of methods can be called on the object by existing related objects. It should be understood in the following figures that the method routing mechanism would check the contents of MT1, MT2 or MT3 when a method is called by an existing related object on the object portrayed in the following figures.

Furthermore, in the following figures, it should be assumed that method table MT1 was created first in time and that method table MT1 contains all of the possible read and write methods that can be called on the object. It should also be assumed that method tables MT2 and MT3 were created later in time in order to implement changes in system objectives. It can be assumed from FIGS. 2–4 that system objectives have changed twice since there are two tables each containing different subsets of the original table (MT1).

Referring now to FIG. 2, an object 210 having a header section 212 containing a method table pointer 215 references a first method table, called MT1 220. Since object 210 references method table MT1, the method routing mechanism as discussed above, would examine the contents of method table MT1 to determine whether a method called on object 210 should be allowed to call on object 210. Method table MT1 220 contains four methods: GetSales 230, SetSales 240, GetDate 250 and SetDate 260. As mentioned, it should be assumed that method table MT1 220 lists all possible read and write methods that can be called on object 210 by existing related objects (not shown). Header section 212 of object 210 also contains a data pointer 214 which references a data section 216 belonging to object 210. It can be assumed that data section 216 contains data which could be read and modified by existing related objects.

In order to provide an example to the reader, it should be assumed that methods GetSales 230 and GetDate 250 are read methods and that methods SetSales 240 and SetDate 260 are write methods. As mentioned, system objectives dictate the contents of a method table referenced by an object. In turn, it can be assumed from FIG. 2 that the system objectives defined for object 210 allow all read methods and write methods listed in the table to be called on object 210. Therefore, since write methods 240,260 can be called on object 210 it can be assumed that system policy allows changes to be made to the state data belonging to object 210.

As mentioned, method tables are created based upon system objectives. It can be assumed that initially an object references a table which lists all possible read and write methods that can be called on the object (shown in FIG. 2). When system objectives change the definition of an object, the new system objectives may only allow a subset of the original methods to be called on the object. When a unique subset of methods can only be called on the object, and a method table containing the unique subset of methods does not exist, a new method table must be created which contains the proper subset of methods. Once a new method table containing the proper subset of methods is created, the method table pointer must be updated to reference the new method table.

Referring now to FIG. 3, object 210 is again shown, but now method table pointer 215 references method table MT2 270. Since object 210 references method table MT2 the method routing mechanism as discussed above, would examine the contents of method table MT2 to determine whether a method called on object 210 should be allowed to call on object 210. As mentioned, only the methods listed in the method table referenced by method table pointer 215 can be called on object 210. Now that object pointer 215 references MT2 270, only the methods listed in method table MT2 270 can be called on object 210. As shown, method table MT2 270 contains only two methods: GetSales 230 and GetDate 250. As mentioned, GetSales 230 and GetDate 250 are read methods.

It should be recognized that in FIG. 3, method table MT2 270 contains a subset of the methods listed in method table MT1 220. As mentioned, method table MT1 220 contains all of the read and write methods which can be called on object 210. It can be assumed that the system objectives defined for object 210 have changed, so that only a subset of the methods listed in method table MT1 can be called on object 210 by existing related objects. The object-oriented disabling mechanism created method table MT2 270 so that only a subset of the methods listed in method table MT1 220 can be called on object 210 by existing related objects. The only differences between method table MT1 220 and method table MT2 270 are that methods SetSales 240 and SetDate 260 listed in method table MT1 220 have been omitted from method table MT2 270. As mentioned, methods SetSales 240 and SetDate 260 are write methods. It should be understood that a null pointer or a pointer to an error method can be placed in method table MT2 where methods SetSales 240 and SetDate 260 were located.

Now that object 210 references method table MT2 containing only read methods as shown in FIG. 3, it can be assumed that system objectives defined for object 210 only allow existing related objects to have read access to the data belonging to object 210. Since existing related objects cannot call write methods on object 210 (as defined by method table MT2) the data belonging to object 210 can not be changed, and will therefore be preserved.

Referring now to FIG. 4, object 210 is again shown, but now method table pointer 215 references method table MT3 280. Since object 210 references method table MT3, the method routing mechanism as discussed above, would examine the contents of method table MT3 to determine whether a method called on object 210 should be allowed to call on object 210. As mentioned, only the methods listed in the method table referenced by method table pointer 215 can be called on object 210. Now that method table pointer 215 references method table MT3 280, only the methods listed in method table MT3 280 can be called on object 210 by existing related objects. As shown, method table MT3 280 contains three methods: GetSales 230, GetDate 250 and SetDate 260. As mentioned, GetSales 230 and GetDate 250 are read methods whereas SetDate 260 is a write method.

As shown in FIG. 4, method table MT3 280 is a subset of method table MT1 220. As mentioned method table MT1 220 contains all of the methods which can be called on object 210 by existing related objects. It can be assumed from FIG. 4, that object-oriented disabling mechanism created method table MT3 280 so that only a subset of the methods listed in method table MT1 220, not already contained within a method table, can be called on object 210. The only difference between method table MT1 220 and method table MT3 280 is that method SetSales 240 listed in method table MT1 220 has been omitted from method table MT3 280.

As is shown in FIG. 4, one write method and two read methods are listed in method table MT3 280 it can be assumed that the system objectives defined for object 210 allow only limited write and full read methods to be called on object 210 by existing related objects. As mentioned, read methods only provide access to data contained within the object whereas write methods can change some part of the data. The only changes which can be made to object are changes made by method SetDate 260. All of the data in object 210 can be accessed for reading by GetSales 230 and GetDate 250 since these methods can be called on object 210, as defined by method table MT3 280.

It should be understood from FIGS. 2 through 4 described above that the methods which can be called on object 210 can be changed at any time to conform with system objectives defined for object 210. The object-oriented disabling mechanism can redefine which methods can be called on object 210 by existing related objects by simply reassigning the method table pointer to reference a different table which contains the proper subset of methods. For example, in FIG. 4 method table pointer 215 references method table MT3 280 which contains limited write and full read methods. This method table pointer reference causes only a subset of all read and write methods to be called on object 210. Should system objectives defined for the object change over time so that the object becomes fully operational again, method table pointer 215 can be changed to reference method table MT1 220 as shown in FIG. 1. Once method table pointer 215 references method table MT1 220, all read and write methods can once again be called on object 210. All method tables defined for object 210 continue to exist in memory for the lifetime of object 210. However, it should be understood that method tables can be deleted if no object is using the method table now or in the future. The method table referenced by method table pointer 215 can be changed at any point in time to reference any method table previously defined for object 210.

Figure 5:
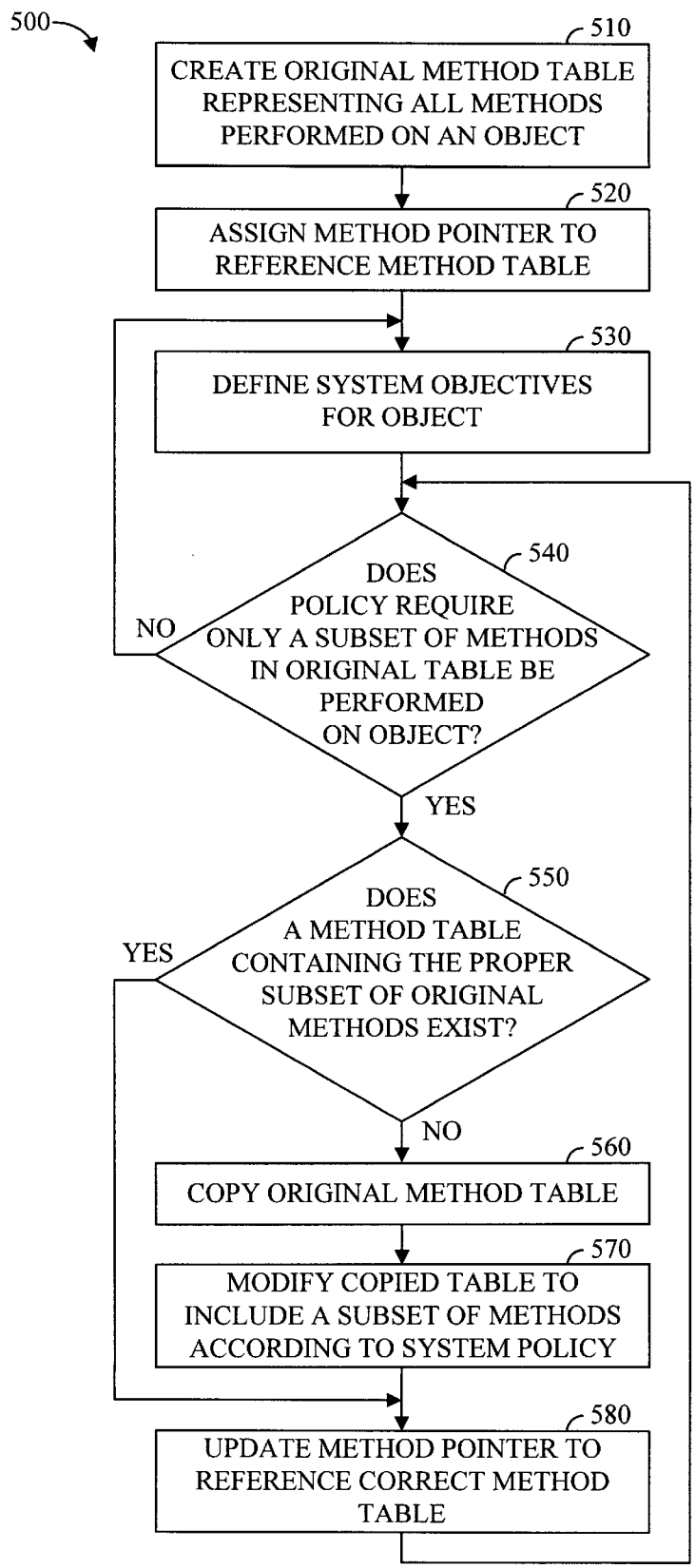
FIG. 5 is a flow diagram of a method for selectively enabling or disabling methods on an object in accordance with a preferred embodiment of the present invention.

Referring now to FIG. 5, a method 500 in accordance with a preferred embodiment of the present invention is shown. Method 500 begins when an object-oriented disabling mechanism creates a table which contains all possible read and write methods that can be called on an object, this method table is called the original method table (step 510). The mechanism then assigns a method table pointer contained within a header section of the object to reference the method table (step 520). Once the pointer is updated to reference the method table, all read and write methods contained within the method table can be called on the object. System objectives defined for the object may then change (step 530) so that only certain methods listed within the table can be called on the object by existing related objects (step 540=YES). In order to implement system objectives defined for the object, if the method table containing the proper subset of methods does not yet exist (step 550=NO), the object-oriented disabling mechanism creates a new method table which lists the proper subset of methods which can be called on the object.

In order to create a subset of methods from the original complete set of read and write methods, the mechanism copies the original table which contains all of the methods (step 560). The object-oriented disabling mechanism then modifies the new method table to contain the proper subset of methods which can be called on the object, as provided by system objectives defined for the object (step 570). The object-oriented disabling mechanism then updates the method table pointer in the header section of the object to reference the new method table (step 580). The object-oriented disabling system then determines whether the system objectives defined for the object again change (step 530). If system objectives requires a subset of methods from original table be called on object (step 540), the object-oriented disabling mechanism checks to see whether a method table containing the proper subset of methods from the original method table exist (step 550). If the proper table does exist (step 550=YES), the mechanism updates the method table pointer to reference the correct table (step 580). If the proper table does not exist (step 550=NO), the mechanism proceeds to step 560. Step 560 through step 580 may be repeated several times, depending on changes in system objectives defined for the object.

Figure 6:
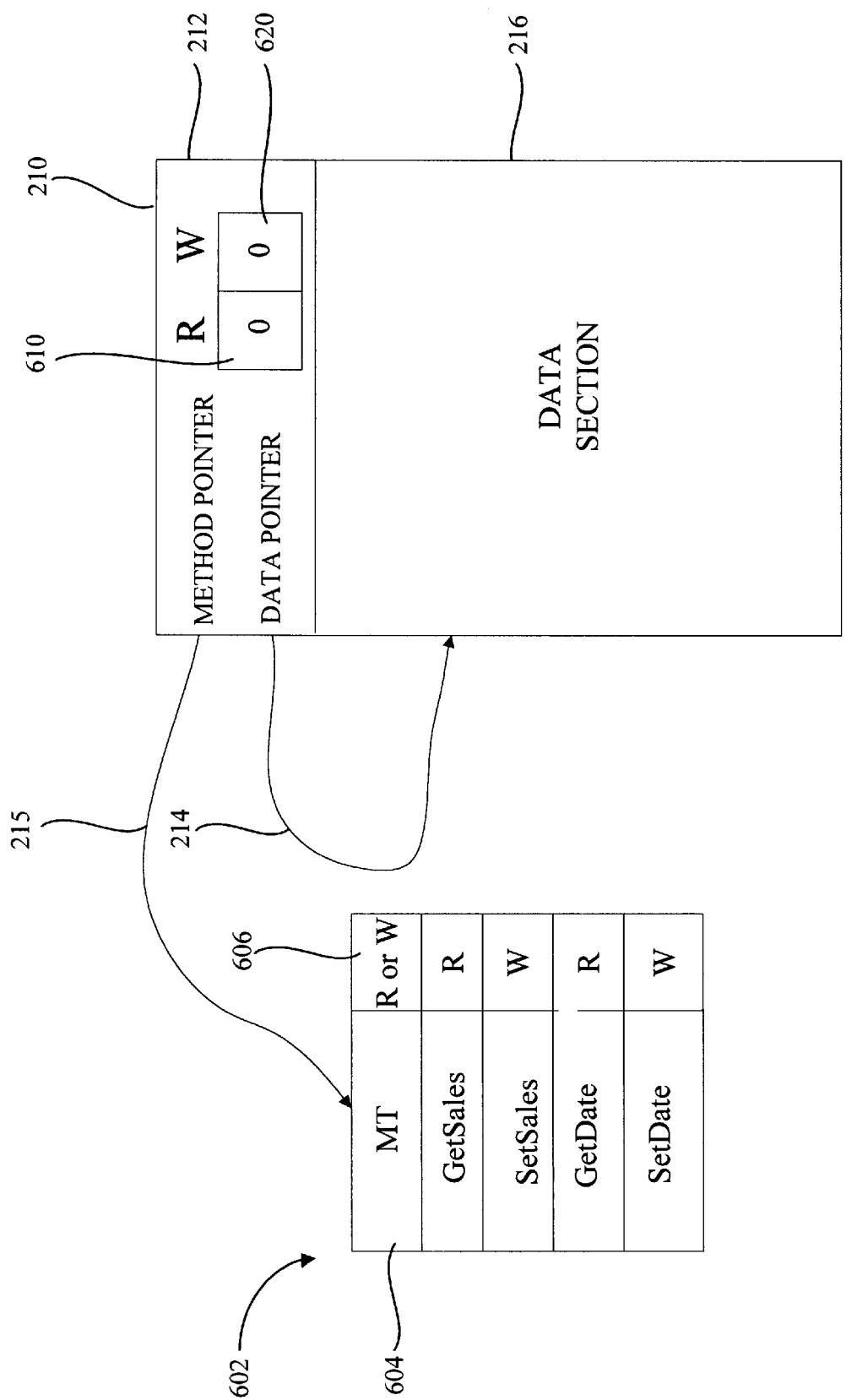
FIG. 6 is a block diagram of an object with a read flag and a write flag in accordance with a preferred embodiment of the present invention.

Referring now to FIG. 6, an object diagram depicting an alternate preferred embodiment of the present invention is shown. Object 210 has two flags; a read flag 610 and a write flag 620 contained within header section 212. It should be understood that the values assigned to read flag 610 and write flag 620 can be changed according to system objectives. The value assigned to each flag can either be a one or a zero. All write methods check the value of write flag 620 whereas all read methods check the value of read flag 610. If the value of write flag 620 is one, write methods can be called on object 210. If the value of read flag 610 is one, read methods can be called on object 210. For the instance shown in FIG. 6 the value of read flag 610 is one and the value of write flag is one. Therefore, both read and write methods can be called on the object since the value assigned to each flag is one.

This alternate embodiment of the present invention uses the flags described above to restrict write operations on an object. As mentioned, each object has two flags; a read flag and a write flag. Each object flag is assigned either a value of one or a value of zero. The value of the write flag can be assigned according to system objectives to prevent some write methods from being called on an object. Further, each object has a method table listing the methods that can be called on the object. Not only does the method table list all of the methods that can be called on the object, but the method table also indicates whether each method is a read method or a write method. Thus, if the value of the write flag belonging to the object is one, all write methods as indicated by the method table can be called on the object. Conversely, if the value of the write flag belonging to the object is zero, none of the write methods as indicated by the method table can be called on the object.

Method table pointer 215 contained within header section 212 of object 210 references a method table MT 602. A first column 604 of method table MT 602 contains all of the methods that can be called on object 210. As listed in first column 604, method GetSales, method SetSales, method GetDate and method SetDate can be called on object 210. A second column 606 of method table MT 602 specifies whether a method listed in first column 604 is a read method or a write method. For example, method GetSales listed in first column 604 has an R in second column 606 which indicates that method GetSales is a read method. Method SetSales has a W in second column 606 which indicates that method SetSales is a write method; method GetDate has an R in second column 606 which indicates that method GetDate is a read method; and method SetDate has a W in second column 606 which indicates that method SetDate is a write method.

As shown in FIG. 6, write flag 620 and read flag 610 have the value of one. As previously mentioned, when the value of write flag 620 is one, all write methods listed in method table MT 602 can be called on object 210. Therefore, data section 216 of object 210 can be changed by write methods SetSales and SetDate. Further, when the value of read flag 610 is one, all read methods listed in method table MT 602 can be called on object 210. Thus, since the value of read flag 610 is one, read methods GetSales and GetDate can be called on object 210. Also, since the value of write flag 620 is one, write methods SetSales and SetDate can be called on object 210.

Figure 7:
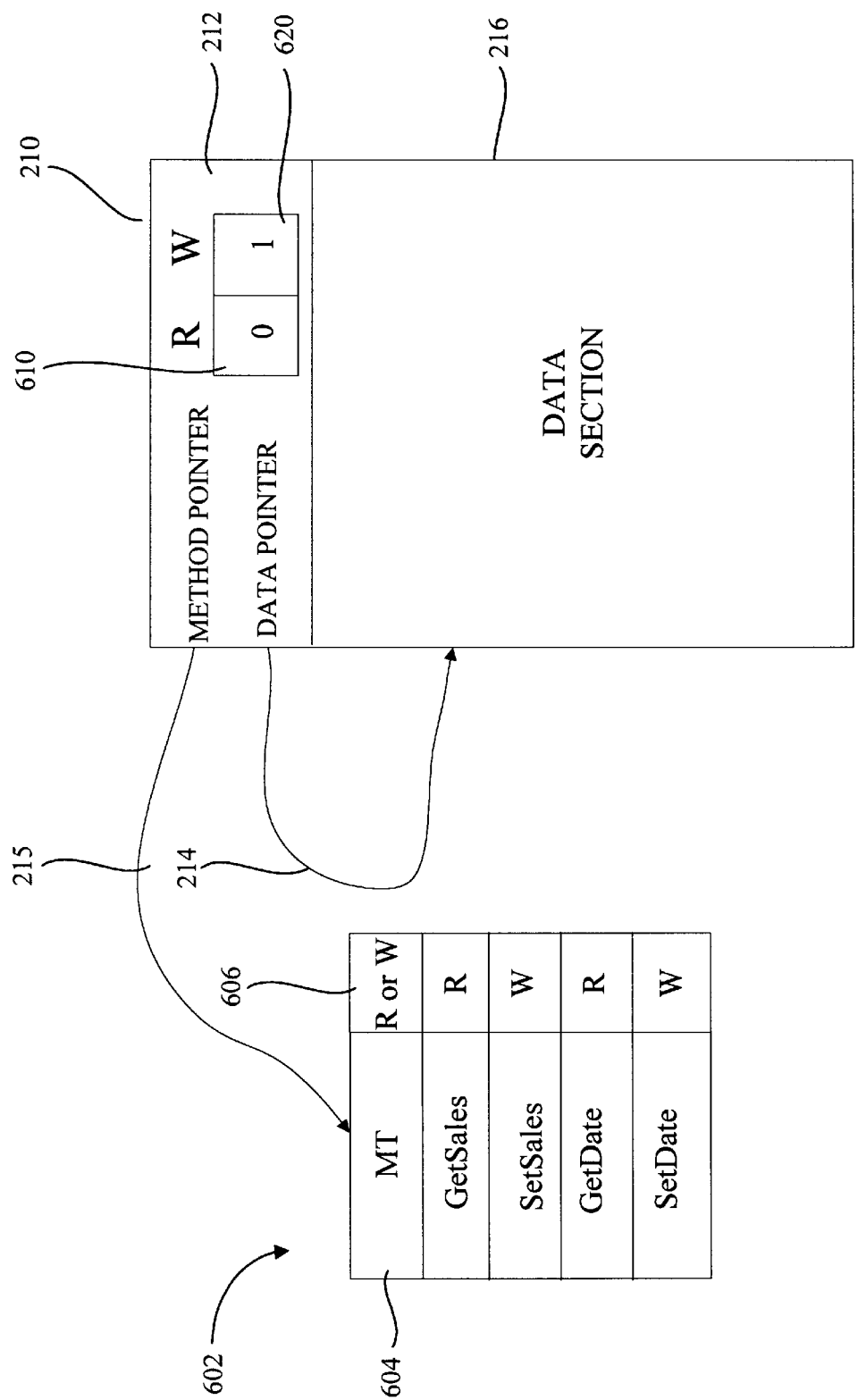
FIG. 7 is a block diagram of the object of FIG. 6 with assignments made to the read and write flags.

Referring now to FIG. 7, the object diagram of FIG. 6 is again shown, but now the value of write flag 620 has been changed. Now, write flag 620 has been assigned the value of zero. It can be assumed that a bit mask operation has been performed on write flag 620 to change the value of write flag 620 from one to zero. As mentioned, when write flag 620 is assigned a value of zero, write methods listed in method table MT 602 cannot be called on object 210. Any write method which checks the current value (zero) of write flag 620 before operating will not proceed to operate on object 210. However, the value of read flag 610 is still one, so read methods GetSales and GetDate listed in method table MT 602 can be called on object 210 by existing related objects.

It should be understood that when the value of write flag 620 is zero that write methods listed in method table MT 602 cannot be called on object 210. Therefore, data section 216 of object 210 cannot be changed by any write method. While data section 216 of object 210 can still be accessed and read, changes cannot be made to data section 216.

The value of the flag must be assigned at different times according to the type of object and the type of storage being used. In systems with non-persistent objects, the system assigns a zero to the write flag before the execution of some write methods in order to prevent the operation from being called on the object.

Another alternative preferred embodiment of the present invention is directed towards systems which allow multiple readers or a single writer (MRSW) to access an object at one time. Many MRSW object-oriented systems use locks to control access to objects between several users. Many users can read the object concurrently. However, if one writer is accessing an object then no other users can access the object. In order to implement this, the MRSW system places a write lock on the object as soon as one writer accesses the object. This lock prevents any other users (read or write )from accessing the object.

Figure 8:
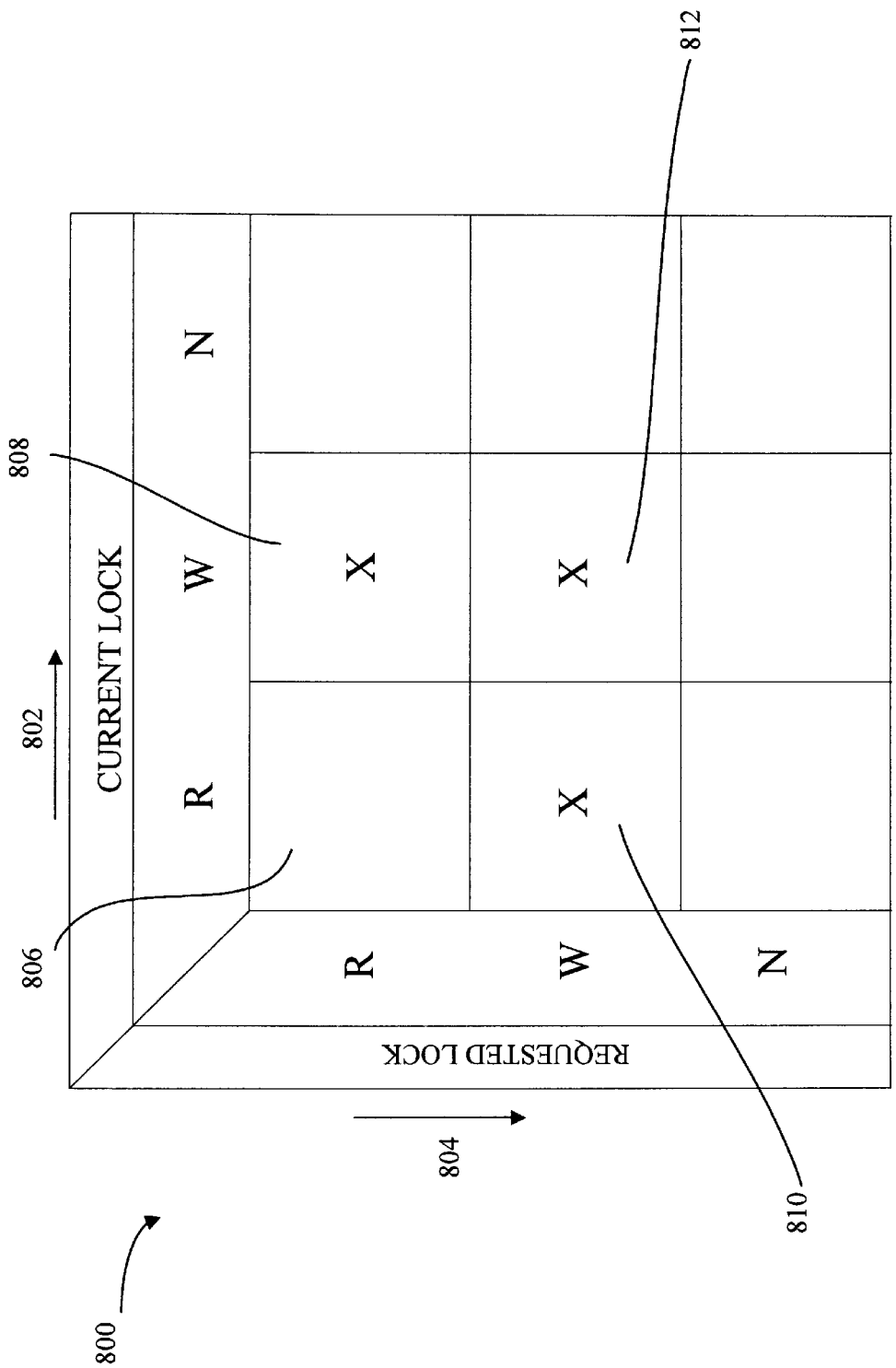
FIG. 8 is a block diagram depicting a lock conflict matrix in accordance with a preferred alternate embodiment of the present invention.

Referring now to FIG. 8, a lock conflict matrix 800 in accordance with a preferred embodiment of the present invention contains a plurality of rows 802 representing the current locks on the object and a plurality of columns 804 representing the requested locks for the object. Four different table entries can be obtained from lock conflict matrix 800, namely, RR 806, RW 808, WR 810 and WW 812. RR entry 806 specifies that a read lock was requested and that the current lock is a read lock; RW entry 808 indicates that a read lock was requested and that the current lock is a write lock; entry WR 810 indicates that a write lock was requested and that the current lock is a write lock; and entry WW 812 specifies that a write lock was requested and that the current lock is a write lock. It is also possible to have entries in either the N column or the N row as shown in FIG. 8. An entry in the N column or N row indicates that a lock has been granted, and that the object requesting a particular lock must wait for the lock to become free. Conversely if there is no entry in the N column or N row where a lock has been granted or requested, the object can be granted the requested lock.

In some object-oriented systems, lock conflict matrices are schematically used to define read and write access to an object by multiple readers, or a single writer (MRSW). The values assigned to the lock conflict matrix represent the rules for allowing accesses to an object. It should be understood that a lock conflict matrix is simply a logical tool used for designing code to restrict accesses to an object. The present invention does not physically access a lock conflict matrix, but using the concept of a lock conflict matrix to control access to an object. For example, when one object has called a write method on an object and has obtained a write lock on the object, all other methods, read or write cannot be called on the object. On the other hand, when an object or process has called a method on an object and has obtained a read lock on the other object, other read methods can be called on the object, however, no write methods can be called on the object.

In lock conflict matrix 800, an "X" entered into the matrix indicates that the requested lock cannot be granted. In FIG. 8, an "X" appears for entries RW 808, WR 810 and WW 812. Therefore, for lock conflict matrix 800 only a read lock will be granted as long as the current lock on the object is a read lock, as indicated by the black entry for RR 806. As indicated by entry RW 808, if there is a write lock on the object, a read lock requested for the object will be denied. Further, as indicated by entry WR, if there is a read lock on the object, a write lock requested for the object will be denied. Finally, if there is a write lock on the object, a write lock requested for the object will be denied. It should be understood that in the present art, locks within lock conflict matrix 800 are short term locks. This indicates that lock conflict matrix 800 is updated as each method is completed. For example, when a write method with a write lock on an object completes, the current lock is updated immediately so that a write lock is no longer on the object. Once the write lock is removed another write lock can be obtained by a write method or a read lock can be obtained by a read method.

An alternate preferred embodiment of the present invention uses the locking methods above to prevent methods from being called on an object. Specifically, the object-oriented disabling mechanism places a long-term read lock on the object to prevent write methods from obtaining write locks for an object. This read lock prevents any write methods from being called on the object, but allows other objects to obtain read locks on the object. Therefore the present invention protects data belonging to the object by creating a long term read lock which prevents any object from obtaining a write lock on the object while still allowing other methods to read the object. The long term read lock placed on the object by the object-oriented disabling mechanism can last indefinitely.

A final alternate embodiment of the present invention uses a transactional mechanism 129 to prevent method calls from making permanent changes to an object. Specifically, when an existing related object calls a write method on an object, transactional mechanism 129 allows the write method to execute on the object. At the end of the transaction, the transactional mechanism determines whether the state belonging to the object has been modified. This can be done by comparing before and after images of the object or, by checking the value of a flag in the object which is set to one whenever the object is modified. If the transactional mechanism determines that a change has been made to the state of the object, the transactional mechanism checks the value of a write flag associated with the object. If the value of the write flag is one, the transactional mechanism allows the changes made to the object state to be written into memory. However, if the value of the write flag is zero, the transactional mechanism rolls back any changes made by the write method and prevents the changes from becoming permanent.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   an object residing in the memory; and
   a disabling mechanism residing in the memory, the disabling mechanism comprising a method table, the method table identifying at least one enabled method and at least one disabled method, and wherein the disabling mechanism uses the method table to selectively enable the at least one enabled method and selectively disable the at least one disabled method, thereby preventing the at least one disabled method from being called on the object while allowing the at least one enabled method to be called on the object.

2. The apparatus of claim 1 wherein the method table identifies the at least one enabled method and the at least one disabled method by listing the at least one enabled method.

3. The apparatus of claim 1 wherein the at least one disabled method is a write method.

4. The apparatus of claim 1 wherein the object contains a method table pointer, the disabling mechanism using the method table pointer to reference the method table.

5. The apparatus of claim 4 wherein the disabling mechanism further comprises a second method table, the second method table identifying a second at least one enabled method and a second at least one disabled method, and wherein the disabling mechanism can select the second method table by modifying the method table pointer to reference the second method, and wherein the disabling mechanism selectively enables the second at least one enabled method and selectively disables the second at least one disabled method when the method table pointer references the second method table, thereby preventing the second at least one disabled method from being called on the object while allowing the second at least one enabled method to be called on the object.

6. The apparatus of claim 1 wherein the method table includes a plurality of flags, with each flag corresponding to a method on the object, and wherein the method table indicates whether a method is enabled by setting the corresponding flag.

7. The apparatus of claim 6 wherein the disabling mechanism selectively sets the plurality of flags to implement a change in a set of system objectives defined for the object.

8. An apparatus comprising:
   at least one processor;
   a memory coupled to the at least one processor;
   a first object residing in the memory;
   a second object residing in the memory;
   at least one method table residing in the memory; and
   a disabling mechanism residing in the memory, the disabling mechanism comprising a method table, the method table identifying at least one enabled method and at least one disabled method on the first object, and wherein the disabling mechanism uses the method table to selectively enable the at least one enabled method and selectively disable the at least one disabled method, thereby preventing the at least one disabled method from being called on the first object by the second object while allowing the at least one enabled method to be called on the first object by the second object.

9. The apparatus of claim 8 wherein the method table identifies the at least one enabled method and the at least one disabled method by listing the at least one enabled method.

10. The apparatus of claim 8 wherein the first object references the at one least one method table using a method table pointer.

11. The apparatus of claim 10 wherein the disabling mechanism further comprises a second method table, the second method table identifying a second at least one enabled method and a second at least one disabled method, and wherein the disabling mechanism can select the second method table by modifying the method table pointer to reference the second method table, and wherein the disabling mechanism selectively enables the second at least one enabled method and selectively disables the second at least one disabled method when the method table pointer references the second method table, thereby preventing the second at least one disabled method from being called on the first object by the second object while allowing the second at least one enabled method to be called on the first object by the second object.

12. An apparatus comprising:
    at least one processor;
    a memory coupled to the at least one processor;
    a first object residing in the memory;
    a second object residing in the memory;
    a disabling mechanism residing in the memory, wherein the disabling mechanism comprises a method table, the method table includes a plurality of flags, with each flag corresponding to a method on the object, and wherein the method table indicates whether a method is enabled by setting the corresponding flag such that the method table identifies at least one enabled method and at least one disabled method, and wherein the disabling mechanism uses the method table to selectively enable the at least one enabled method and selectively disable the at least one disabled method, thereby preventing the at least one disabled method from being called on the object while allowing the at least one enabled method to be called on the object.

13. The apparatus of claim 12 wherein the disabling mechanism selectively sets the plurality of flags to implement a change in a set of system objectives defined for the object.

14. An apparatus for calling methods on an object, the apparatus comprising:
    at least one processor;
    a memory coupled to the at least one processor;
    a disabling mechanism residing in the memory, the disabling mechanism comprising a method table pointer, a first method table and a second method table, the first method table identifying a first at least one enabled method and a first at least one disabled method on the object, the second method table identifying a second at least one enabled method and a second at least one disabled method on the object, and wherein the disabling mechanism selectively enables the first at least one enabled method and selectively disables the first at least one disabled method when the method table pointer references the first method table, thereby preventing the first at least one disabled method from being called on the object while allowing the first at least one enabled method to be called on the object, and wherein the disabling mechanism selectively enables the second at least one enabled method and selectively disables the second at least one disabled method when the method table pointer references the second method table, thereby preventing the second at least one disabled method from being called on the object while allowing the second at least one enabled method to be called on the object.

15. The apparatus of claim 14 wherein the method table identifies the at least one enabled method and the at least one disabled method by listing the at least one enabled method.

16. The apparatus of claim 14 wherein the disabling mechanism updates the method table pointer to reference the second method table in response to a change in the set of system objectives defined for the object.

17. The apparatus of claim 14 wherein the disabling mechanism creates a third method table, the third method table identifying a third at least one enabled method and a third at least one disabled method, and wherein the disabling mechanism can select the third method table by modifying the method table pointer to reference the third method table, and wherein the disabling mechanism selectively enables the third at least one enabled method and selectively disables the third at least one disabled method when the method table pointer references the third method table, thereby preventing the third at least one disabled method from being called on the object while allowing the third at least one enabled method to be called on the object.

18. The apparatus of claim 17 wherein the third at least one enabled method and the third at least one disabled method are selected to implement a a change in a set of system objectives defined for the object.

19. The apparatus of claim 17 wherein the third method table is created by the disabling mechanism only when the first method table and the second method table do not contain the third at least one enabled method and the third at least one disabled method needed to implement the set of system objectives.

20. A program product comprising:
   a disabling mechanism, the disabling mechanism comprising a method table, the method table identifying at least one enabled method and at least one disabled method, and wherein the disabling mechanism uses the method table to selectively enable the at least one enabled method and selectively disable the at least one disabled method, thereby preventing the at least one disabled method from being called on an object while allowing the at least one enabled method to be called on the object; and
   a signal bearing media bearing the disabling mechanism.

21. The program product of claim 20 wherein the signal bearing media comprises transmission media.

22. The program product of claim 20 wherein the signal bearing media comprises recordable media.

23. The program product of claim 20 wherein the at least one disabled method is a write method.

24. The program product of claim 20 wherein the method table includes a plurality of flags, with each flag corresponding to a method on the object, and wherein the method table indicates whether a method is enabled by setting the corresponding flag.

25. The program product of claim 24 wherein the disabling mechanism selectively sets the plurality of flags to implement a change in a set of system objectives defined for the object.

26. The program product of claim 24 wherein the disabling mechanism creates a third method table, the third method table identifying a third at least one enabled method and a third at least one disabled method, and wherein the disabling mechanism can select the third method table by modifying the method table pointer to reference the third method table, and wherein the disabling mechanism selectively enables the third at least one enabled method and selectively disables the third at least one disabled method when the method table pointer references the third method table, thereby preventing the third at least one disabled method from being called on the object while allowing the third at least one enabled method to be called on the object.

27. The program product of claim 26 wherein the third at least one enabled method and the third at least one disabled method are selected to implement a change in a set of system objectives defined for the object.

28. The program product of claim 27 wherein the third method table is created by the disabling mechanism only when the first method table and the second method table do not contain the third at least one enabled method and the third at least one disabled method needed to implement the set of system objectives.

29. The program product of claim 24 wherein the method table identifies the at least one enabled method and the at least one disabled method by listing the at least one enabled method.

30. A method comprising the steps of:
   providing a disabling mechanism, the disabling mechanism comprising a method table pointer, a first method table and a second method table, the first method table identifying a first at least one enabled method and a first at least one disabled method on the object, the second method table identifying a second at least one enabled method and a second at least one disabled method on the object, and wherein the disabling mechanism selectively enables the first at least one enabled method and selectively disables the first at least one disabled method when the method table pointer references the first method table, thereby preventing the first at least one disabled method from being called on the object while allowing the first at least one enabled method to be called on the object, and wherein the disabling mechanism selectively enables the second at least one enabled method and selectively disables the second at least one disabled method when the method table pointer references the second method table, thereby preventing the second at least one disabled method from being called on the object while allowing the second at least one enabled method to be called on the object; and
   switching the method table pointer from referencing the first method table to referencing the second method table in response to a change of system objectives for the object.

31. The method of claim 30 further comprising the step of creating a third method table, the third method table identifying a third at least one enabled method and a third at least one disabled method, and wherein the disabling mechanism can select the third method table by modifying the method table pointer to reference the third method table, and wherein the disabling mechanism selectively enables the third at least one enabled method and selectively disables the third at least one disabled method when the method table pointer references the third method table, thereby preventing the third at least one disabled method from being called on the object while allowing the third at least one enabled method to be called on the object.

32. The method of claim 31 further comprising the step of switching the method table pointer to the third method table in response to a second change of system objectives for the object.

33. A method for selectively disabling method calls, the method comprising the steps of:

creating a first method table, the first method table identifying a first at least one enabled method and a first at least one disabled method on an object;

selectively enabling the first at least one enabled method using the first method table and selectively disabling the first at least one disabled method identified in the first method table; and preventing the first at least one disabled method from being called on the object while allowing the first at least one enabled method to be called on the object.

34. The method of claim 33 further comprising the step of creating a second method table, the second method table identifying a second at least one enabled method and a second at least one disabled method on the object where the second at least one enabled method and the second at least one disabled method contained in the second method table are defined on system objectives.

35. The method of claim 34 further comprising the step of updating a method table pointer in the first object to reference the second method table, thereby allowing only the second at least one enabled method in the second method table to be called on the object.

* * * * *